(12) United States Patent
Gilbert

(10) Patent No.: US 9,373,178 B2
(45) Date of Patent: Jun. 21, 2016

(54) HIGH DYNAMIC RANGE DISPLAYS HAVING WIDE COLOR GAMUT AND ENERGY EFFICIENCY

(75) Inventor: John Gilbert, Pacifica, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 148 days.

(21) Appl. No.: 14/237,309

(22) PCT Filed: Aug. 23, 2012

(86) PCT No.: PCT/US2012/052120
§ 371 (c)(1),
(2), (4) Date: Feb. 5, 2014

(87) PCT Pub. No.: WO2013/028900
PCT Pub. Date: Feb. 28, 2013

(65) Prior Publication Data
US 2014/0192078 A1    Jul. 10, 2014

Related U.S. Application Data

(60) Provisional application No. 61/527,006, filed on Aug. 24, 2011.

(51) Int. Cl.
*G06T 11/00* (2006.01)
*G09G 3/34* (2006.01)
(Continued)

(52) U.S. Cl.
CPC ........ *G06T 11/001* (2013.01); *G02F 1/133514* (2013.01); *G09G 3/3406* (2013.01); *G09G 3/3413* (2013.01); *G09G 3/3426* (2013.01); *G02F 2001/133614* (2013.01); *G09G 5/028* (2013.01); *G09G 2300/023* (2013.01); *G09G 2320/0666* (2013.01); *G09G 2340/0457* (2013.01); *G09G 2340/06* (2013.01)

(58) Field of Classification Search
CPC . G09G 3/3406; G09G 3/3413; G09G 3/3426; G09G 11/001; G02F 1/133514
See application file for complete search history.

(56) References Cited

U.S. PATENT DOCUMENTS

| 5,347,378 A | 9/1994 | Handschy |
| 5,737,045 A | 4/1998 | Abileah |
| 6,542,145 B1 | 4/2003 | Reisinger |

(Continued)

FOREIGN PATENT DOCUMENTS

| JP | 2000-075293 | 3/2000 |
| JP | 2007-178902 | 7/2007 |

(Continued)

OTHER PUBLICATIONS

"Quantum Dot LCD HDTV", Dec. 31, 2009.
(Continued)

*Primary Examiner* — Abbas Abdulselam

(57) ABSTRACT

Several embodiments of display systems that have wide color gamut performance are disclosed herein. In one embodiment, a display system comprises a plurality of emitters, said emitters emanating light into an optical path; a first modulator, said first modulator comprising a plurality of colored subpixels and wherein said first modulator transmitting light emanating from said emitters in said optical path; and a color notch filter, said color notch filter placed in said optical path for conditioning or convolving light together with said first modulator.

17 Claims, 9 Drawing Sheets

(51) Int. Cl.
*G09G 5/02* (2006.01)
*G02F 1/1335* (2006.01)

(56) References Cited

U.S. PATENT DOCUMENTS

| | | | |
|---|---|---|---|
| 6,799,865 B2 | 10/2004 | Ellens | |
| 7,036,946 B1 | 5/2006 | Mosier | |
| 7,355,780 B2 * | 4/2008 | Chui | G02B 26/001 348/E5.142 |
| 7,481,562 B2 | 1/2009 | Chua | |
| 7,609,230 B2 | 10/2009 | Dispoto | |
| 7,630,030 B2 | 12/2009 | Jang | |
| 7,649,594 B2 | 1/2010 | Kim | |
| 7,753,530 B2 | 7/2010 | Whitehead | |
| 7,777,945 B2 | 8/2010 | Seetzen | |
| 7,800,822 B2 | 9/2010 | Seetzen | |
| 7,872,659 B2 | 1/2011 | Seetzen | |
| 8,125,425 B2 | 2/2012 | Seetzen | |
| 8,289,270 B2 | 10/2012 | Wallener | |
| 8,493,313 B2 | 7/2013 | Damberg | |
| 8,872,861 B2 * | 10/2014 | Botzas | G09G 3/3413 345/102 |
| 2003/0063231 A1 | 4/2003 | Dai | |
| 2003/0117546 A1 | 6/2003 | Conner | |
| 2005/0007517 A1 | 1/2005 | Anandan | |
| 2006/0002131 A1 | 1/2006 | Schultz | |
| 2006/0109682 A1 | 5/2006 | Ko | |
| 2006/0240286 A1 | 10/2006 | Park | |
| 2007/0146584 A1 | 6/2007 | Wang | |
| 2007/0171186 A1 | 7/2007 | Chang | |
| 2008/0024410 A1 * | 1/2008 | Ben-David | G09G 3/3413 345/88 |
| 2008/0151139 A1 | 6/2008 | Lynam | |
| 2008/0192158 A1 | 8/2008 | Yoshihara | |
| 2009/0174638 A1 | 7/2009 | Brown | |
| 2009/0213576 A1 | 8/2009 | Chang | |
| 2009/0315822 A1 | 12/2009 | Biebel | |
| 2009/0322800 A1 | 12/2009 | Atkins | |
| 2010/0079704 A1 | 4/2010 | Cho | |
| 2010/0134521 A1 | 6/2010 | Hente | |
| 2010/0214282 A1 | 8/2010 | Whitehead | |
| 2010/0277492 A1 | 11/2010 | Frederick | |
| 2011/0096108 A1 * | 4/2011 | Brown Elliott | G06T 3/4015 345/694 |
| 2011/0279749 A1 | 11/2011 | Erinjippurath | |
| 2012/0154417 A1 | 6/2012 | Ninan | |
| 2012/0154422 A1 | 6/2012 | Ninan | |
| 2012/0154464 A1 | 6/2012 | Ninan | |
| 2012/0155060 A1 | 6/2012 | Ninan | |
| 2013/0265343 A1 | 10/2013 | Ninan | |
| 2013/0335682 A1 | 12/2013 | Gilbert | |
| 2014/0049734 A1 | 2/2014 | Erinjippurath | |

FOREIGN PATENT DOCUMENTS

| | | |
|---|---|---|
| JP | 2009-139787 | 6/2009 |
| JP | 2009-163197 | 7/2009 |
| JP | 2011-180365 | 9/2011 |

OTHER PUBLICATIONS

"Nanosys and LG Close to Bringing Quantum Dot Technology to LCD Displays" Nov. 4, 2010.

* cited by examiner

HIGH DYNAMIC RANGE DISPLAYS HAVING WIDE COLOR GAMUT AND ENERGY EFFICIENCY

CROSS-REFERENCE TO RELATED APPLICATIONS

This application claims priority to U.S. Provisional Patent Application No. 61/527,006 filed 24 Aug. 2011, which is hereby incorporated by reference for all purposes.

TECHNICAL FIELD

The present invention relates to displays systems and, more particularly, to novel display systems having wide color gamut performance, high-to-infinite contrast and/or high energy efficiency.

BACKGROUND

In the field of high contrast, energy efficient, wide color gamut displays, it is known to create displays comprising a backlight of discrete independently controllable emitters (e.g. LEDs—both inorganic and organic) and a high resolution LCD panel. The combination of a low resolution backlight and a high resolution LCD panel (i.e. "dual modulator displays") is disclosed further in co-owned: (1) U.S. Pat. No. 7,753,530 entitled "HDR DISPLAYS AND CONTROL SYSTEMS THEREFOR"; (2) United States Patent Application Publication Number 2009322800 entitled "METHOD AND APPARATUS IN VARIOUS EMBODIMENTS FOR HDR IMPLEMENTATION IN DISPLAY DEVICES"; (3) United States Patent Application Publication Number 2009284459 entitled "ARRAY SCALING FOR HIGH DYNAMIC RANGE BACKLIGHT DISPLAYS AND OTHER DEVICES"; (4) United States Patent Application Publication Number 2008018985 entitled "HDR DISPLAYS HAVING LIGHT ESTIMATING CONTROLLERS"; (5) United States Patent Application Publication Number 20070268224 entitled "HDR DISPLAYS WITH DUAL MODULATORS HAVING DIFFERENT RESOLUTIONS"; (6) United States Patent Application Publication Number 20070268211 entitled "HDR DISPLAYS WITH INDIVIDUALLY-CONTROLLABLE COLOR BACKLIGHTS"; (7) United States Patent Application Publication Number 20100214282 entitled "APPARATUS FOR PROVIDING LIGHT SOURCE MODULATION IN DUAL MODULATOR DISPLAYS"; (8) United States Patent Application Publication Number 20090201320 entitled "TEMPORAL FILTERING OF VIDEO SIGNALS"; (8) United States Patent Application Publication Number 20070268695 ("the '695 application") entitled "WIDE COLOR GAMUT DISPLAYS"—all of which are hereby incorporated by reference in their entirety.

SUMMARY

Several embodiments of display systems and methods of their manufacture and use are herein disclosed.

In one embodiment, a display system comprises a one or more emitters, said one or more emitters emanating light into an optical path; a first modulator, said first modulator comprising a plurality of colored subpixels and wherein said first modulator transmitting light emanating from said emitters in said optical path; and a color notch filter, said color notch filter placed in said optical path for conditioning light transmitted by said plurality of said colored subpixels.

In yet another embodiment, the display system comprises an array of discrete, individually controllable emitters and the emitters may either be colored emitters or full spectrum (white) emitters. Such emitters may be OLED elements, quantum dots excitation or any other known nano-structure capable of producing white light.

In yet another embodiment, the OLED elements may comprise a UV emitter and a photoluminescent material or combination thereof that converts the UV light to visible light. In one embodiment, the visible light is full spectrum (white) light that illuminates the LCD modulator comprising itself of colored subpixels. A color notch filter is provided within the optical path and/or stack such that the color notch filter mitigates any crosstalk between signals of different color bands that may emit through a colored subpixel—e.g. designated as a different color. Such conditioning of the light (either before or after the LCD modulator) may allow the display system to render highly saturated images with better fidelity.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
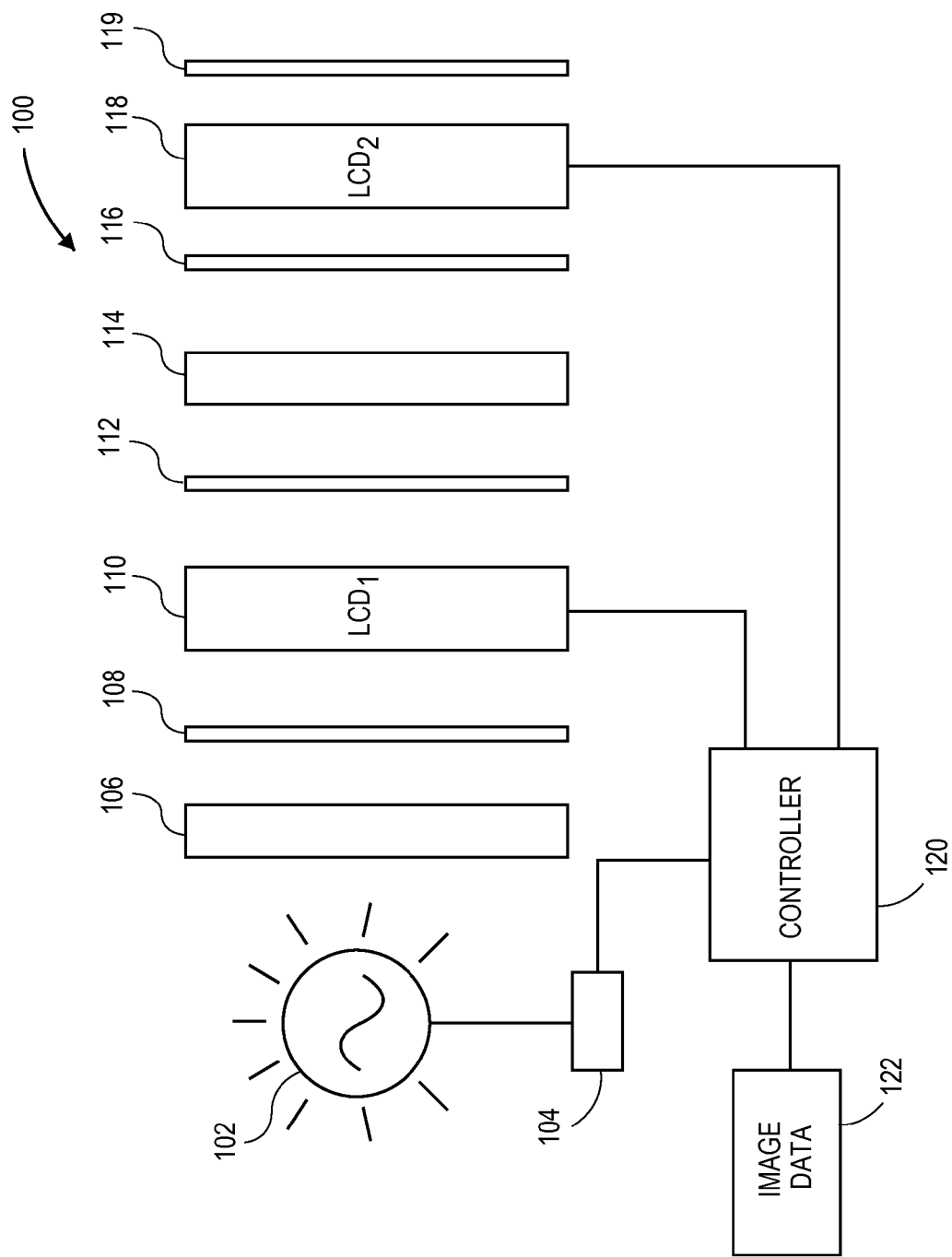
FIG. 1 shows an embodiment of a display made for high dynamic range comprising a white backlight and two LCD modulators.

Many display system configurations have attempted to affect high dynamic range. One such configuration is shown in FIG. 1 of the '695 application noted above. That configuration is a low resolution array of colored LED backlights that illuminates one side of a higher resolution LCD panel. The combination of separately modulated LED backlights, together with a separately modulated LCD panel, produces a display of very high dynamic range. The cost of such a display is driven in part by the cost of the LED backlights and the processing requirements needed to implement the dual modulated display. The processing requirements of such a system also depend upon the number of different LEDs whose light may transmit through any given subpixel of the LCD panel. As a rule of thumb, the more LEDs illuminating a LCD subpixel, the more processing is required to accurately and faithfully reproduce a rendered image thereon.

To produce a display that exhibits a similar high dynamic range; but without the cost of a backlight comprising an array of colored LEDs, various configurations are possible. FIG. 1 is one such embodiment of a display system 100 that achieves high dynamic range without a separately modulated backlight. Display system 100 comprises a white light source 102 that receives power and/or control signals with controller 104. White light emitted from light source 102 may enter an optical stack, such as diffuser 106, polarizer 108, first LCD panel 110, polarizer 112, diffuser 114 (which may be a holographic diffuser, bulk diffuser or otherwise), polarizer 116, second LCD panel 118 and finishing high contrast polarizer 119 and an optional front surface for possible matte finish, scratch resistance, wider viewing angle, among other aspects. In some embodiment, diffuser 106 may also comprise other collimating films, such as BEF or prismatic light collimating films, as is known in the art.

First LCD panel 110 and second LCD panel 118 may be driven by control signals from controller 120 based on image data 122 that is desired to be rendered coming out from second LCD 118. Optionally, light source 102 may be also controlled by controller 120 to affect some type of known dimming scheme (i.e. local or global).

Many possible variations of this configuration are possible. For example, first LCD panel may comprise monochrome or colored subpixels and second LCD panel may comprise colored or monochrome subpixels respectively. It is possible that both first and second LCD panels may comprise colored subpixels; but that, given the low transmissivity rates of colored LCD panels in the first place, a combination of two such colored LCD panels may make a resulting display of low peak luminosity—which might be solved by employing an extremely bright (and expensive) white backlight.

For examples of such high dynamic range displays that comprises at least two LCD panels, the following commonly-owned applications: (1) U.S. patent application Ser. No. 12/780,740 filed on May 14, 2010 entitled "HIGH DYNAMIC RANGE DISPLAYS USING FILTERLESS LCD(s) FOR INCREASING CONTRAST AND RESOLUTION"; (2) Provisional U.S. Patent Application No. 61/479, 966 filed on Apr. 28, 2011, entitled "DUAL PANEL DISPLAY WITH CROSS BEF COLLIMATOR AND POLARIZATION-PRESERVING DIFFUSER"; (3) Provisional U.S. Patent Application No. 61/450,802 filed on Mar. 9, 2011, entitled "HIGH CONTRAST GRAYSCALE AND COLOR DISPLAYS"; (4) Provisional U.S. Patent Application No. 61/486,160 filed on May 13, 2011 entitled "TECHNIQUES FOR QUANTUM DOTS"; (5) Provisional U.S. Patent Application No. 61/486, 171 filed on May 13, 2011 entitled "QUANTUM DOTS FOR DISPLAY PANELS".—which are all hereby incorporated by reference in their entirety—describe systems and methods of employing more than one LCD modulators comprising a high dynamic display system.

In the case where first LCD panel comprises monochrome subpixels, second LCD panel comprises colored subpixels, and further where first LCD panel is of lower resolution than second LCD panel, the resulting luminosity is not so compromised; but there may be other effects that may be addressed. One such effect may be the resulting color gamut of the display.

In this embodiment, it may be the case that the light reaching any given colored subpixel in the second LCD panel is a combination of light from a plurality of subpixels of neighboring subpixels in the first LCD panel. This effect may be controllable by constructing an optical stack whereby the distance between the first LCD panel and the second LCD panel is diminished. However, if first LCD panel comprises a monochrome panel, the white light emitted from first LCD panel, composed of different colors, illuminates the colored subpixels of the second LCD panel. The result may compromise the color gamut of the resulting display system.

Figure 2:
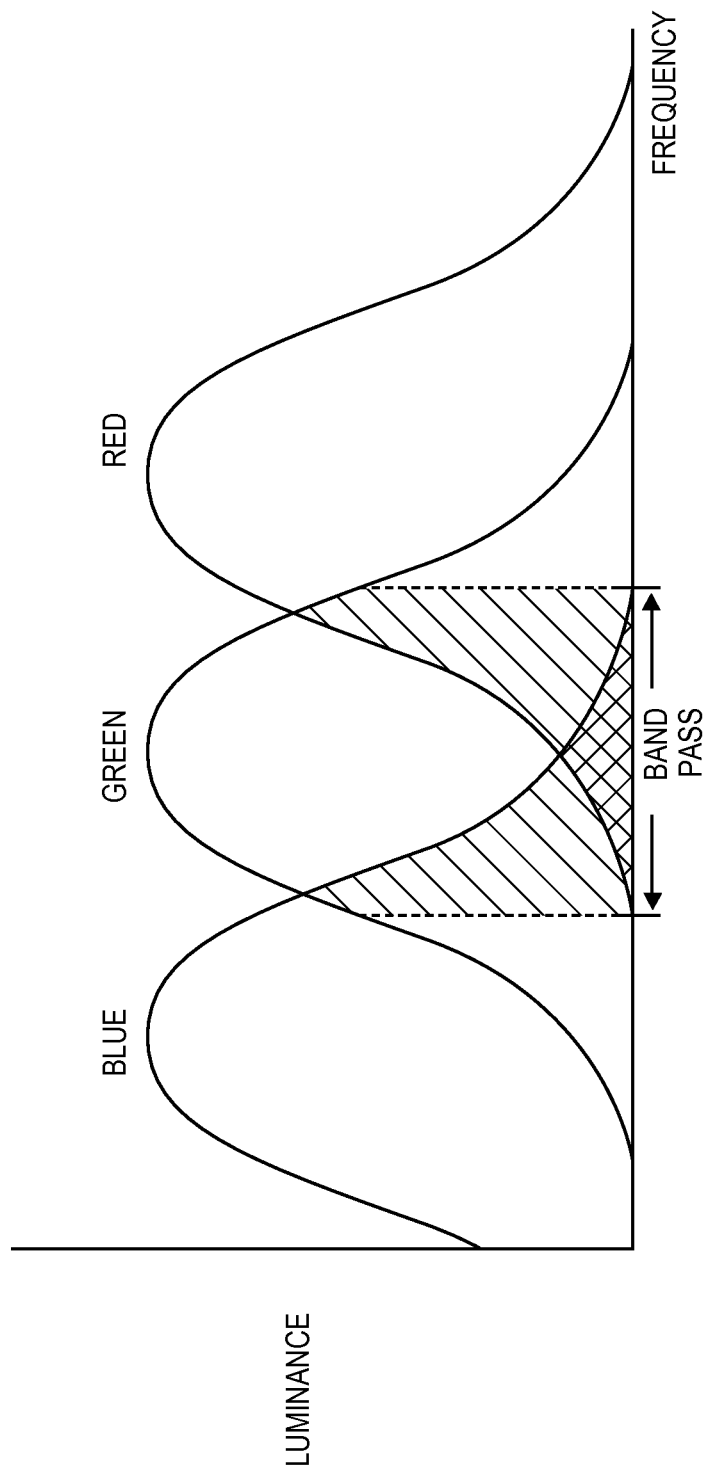
FIG. 2 shows the point spread function of light from a white backlight as transmitted through one exemplary LCD comprising colored subpixels.

For example, FIG. 2 shows a mapping of the spectrum of the white light (here composed of three primary colors, blue, green and red) illuminating an exemplary green subpixel of the second LCD panel. As colored subpixels are constructed, each colored subpixel comprises a color band pass (as shown in FIG. 2 for the exemplary green subpixel). A smaller band pass may tend to compromise luminosity of the display system; while a larger band pass may tend to compromise the color gamut of the display system. As shown in FIG. 2, if the band pass is wide in the green subpixels, a certain amount of both blue and red light may come through the green subpixel—affecting a compromise on the color gamut of the display system.

Figure 3:
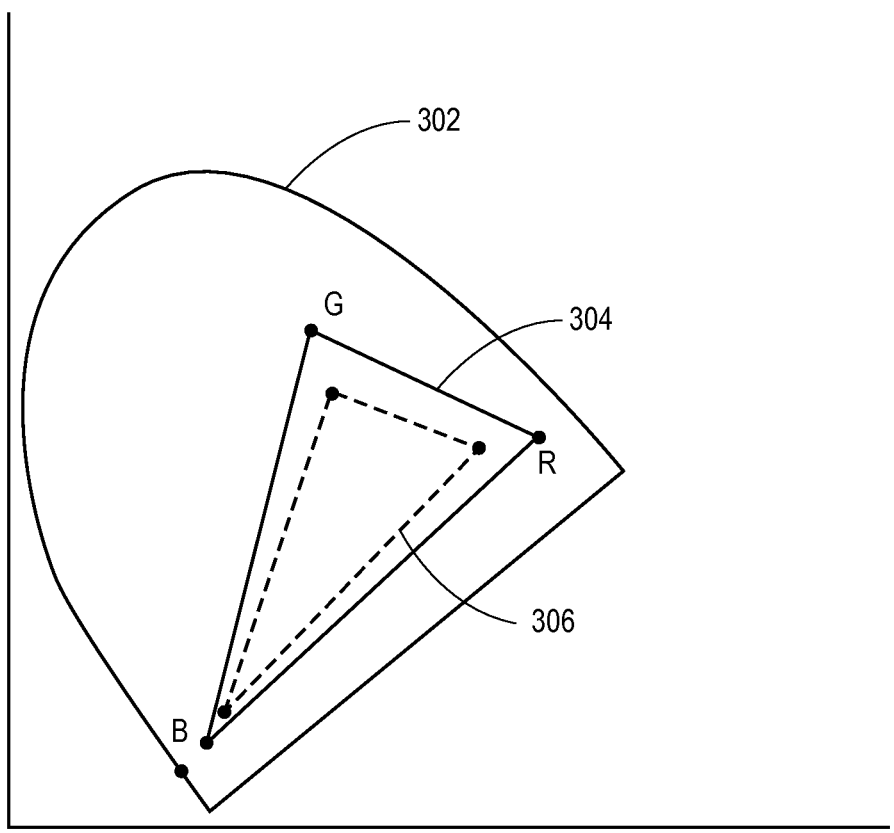
FIG. 3 shows the color gamut of a display as made in accordance with architecture of FIG. 1.

FIG. 3 shows one exemplary color gamut of such a display system. Color envelope 302 is the familiar shape of the CIE 1931 chromaticity chart—whereby the inverted U-shape is a curve of monochrome color points. Triangular color gamut 304 is representational of many possible gamuts that display systems may produce—e.g. Rec 709, P3 color space, Adobe RGB or the like. P3 color space and Adobe RGB are two such color gamuts that are currently employed for high definition image data format. It is noticed that P3 comprises three primary points, vertices of the triangle, in green (G), blue (B) and red (R) parts of the color gamut.

Due to the color crosstalk between filters—e.g. parts of the blue and red spectrum from the backlight bleeding into the green pass band of the green colored subpixels of the LCD, the actual color gamut of a display made in accordance with FIG. 1 is reduced, as shown in the dotted triangular gamut region 306. As a result, there may be a noticeable reduction in the color fidelity reproduction in some image scenes that have highly saturated colors to render.

First Embodiment

Figure 4:
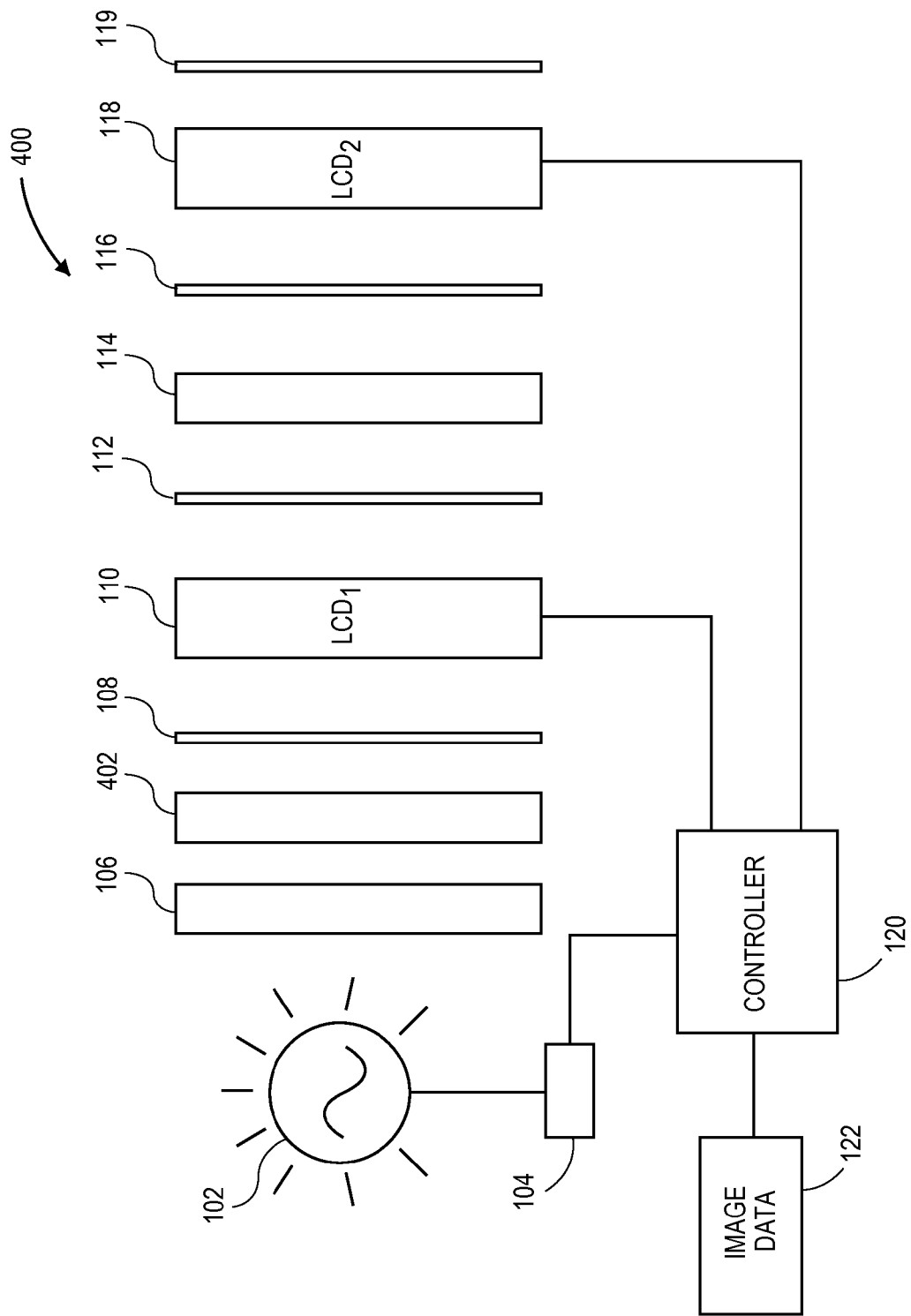
FIG. 4 shows one embodiment of a display system having wide color gamut performance.

FIG. 4 is one embodiment of a display system (400) having an improved color gamut. Display system 400 may be constructed substantially similar to the display system of FIG. 1—with the addition of color notch filter 402 interspersed in the optical path between diffuser/light shaper 106 and first polarizer 108. This location for the color notch filter may be desirable as this is the part of the optical path where the light is most collimated. It will be appreciated that the color notch filter may be placed in other parts of the optical path for the purposes of this application.

Figure 5:
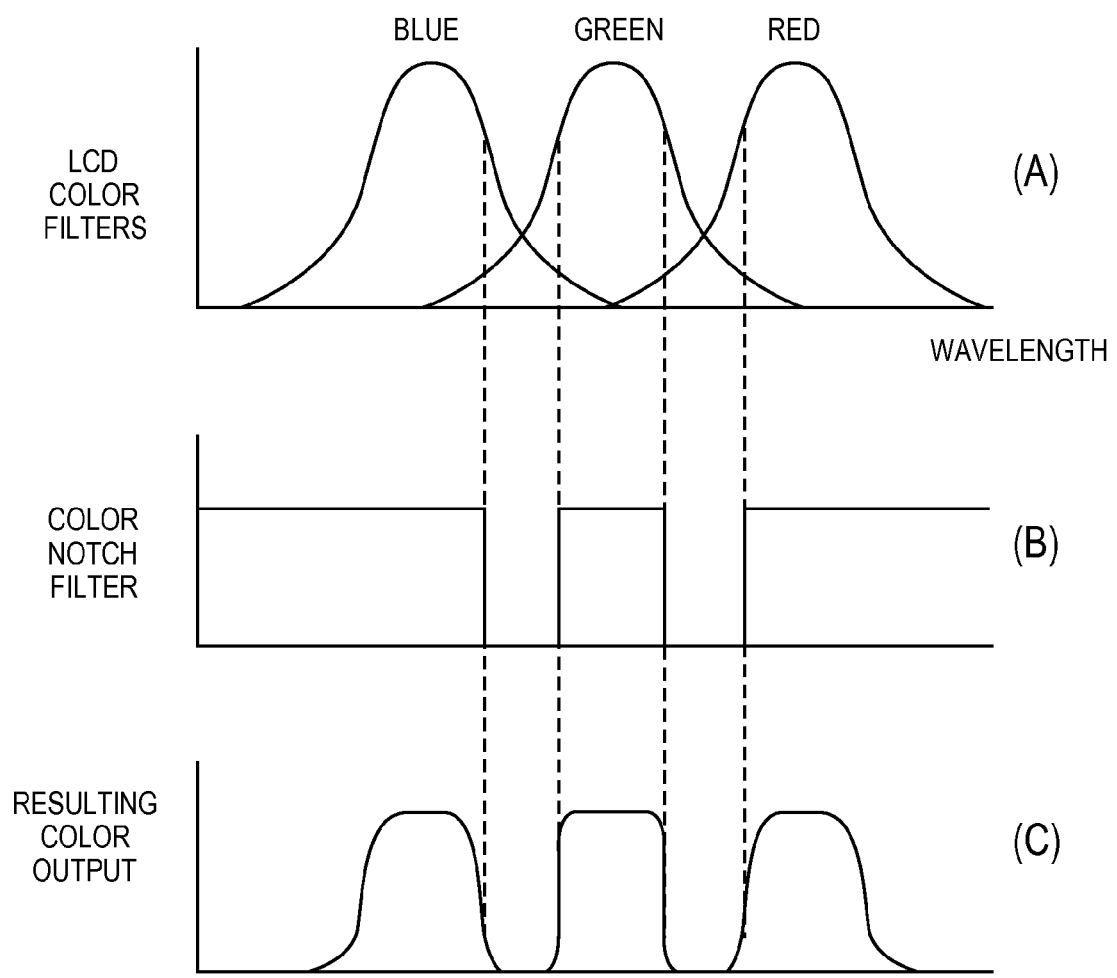
FIGS. 5A, 5B and 5C show the color performance of the display system as shown in FIG. 4.

FIGS. 5A, B and C represent the application of color notch filter to display system 400. FIG. 5A, as previously discussed above, represents the light reaching the colored subpixels of a LCD (e.g. second LCD 118). The crosstalk of the three colors through one respective colored subpixel may lead to desaturation of certain colors within images on occasion. Color notch filter 402 has the effect of a pass band filter—as shown in FIG. 5B—that has the tendency to reduce the aforementioned crosstalk. As the light passes through notch filter 402 and onto colored subpixels of LCD 118, the resulting light is shown in FIG. 5C. This distinct separation of the colors, without the aforementioned crosstalk, has the effect of keeping highly saturated colors within images truer.

In general, the placement of a color notch filter and one or more modulators (e.g. LCDs) and other optical elements performs a convolution upon the light emitted from the backlight. The resulting convolution may determine, as noted above, in a desired color gamut of the display system. It will be appreciated that the location of color notch filter 402 may vary and still have similar effect. Notch filter 402 may be placed in other locations of the optical stack. It suffices that the placement of notch filter 402 be such that the resulting light affords a degree of abatement of the crosstalk mentioned above.

Second Embodiment

Apart from the improvement of the color gamut of the display system as shown in FIG. 1 with the addition of a color notch filter, it may be desirable to have the same improvement with other display systems that have different, perhaps more energy efficient designs.

Figure 6:
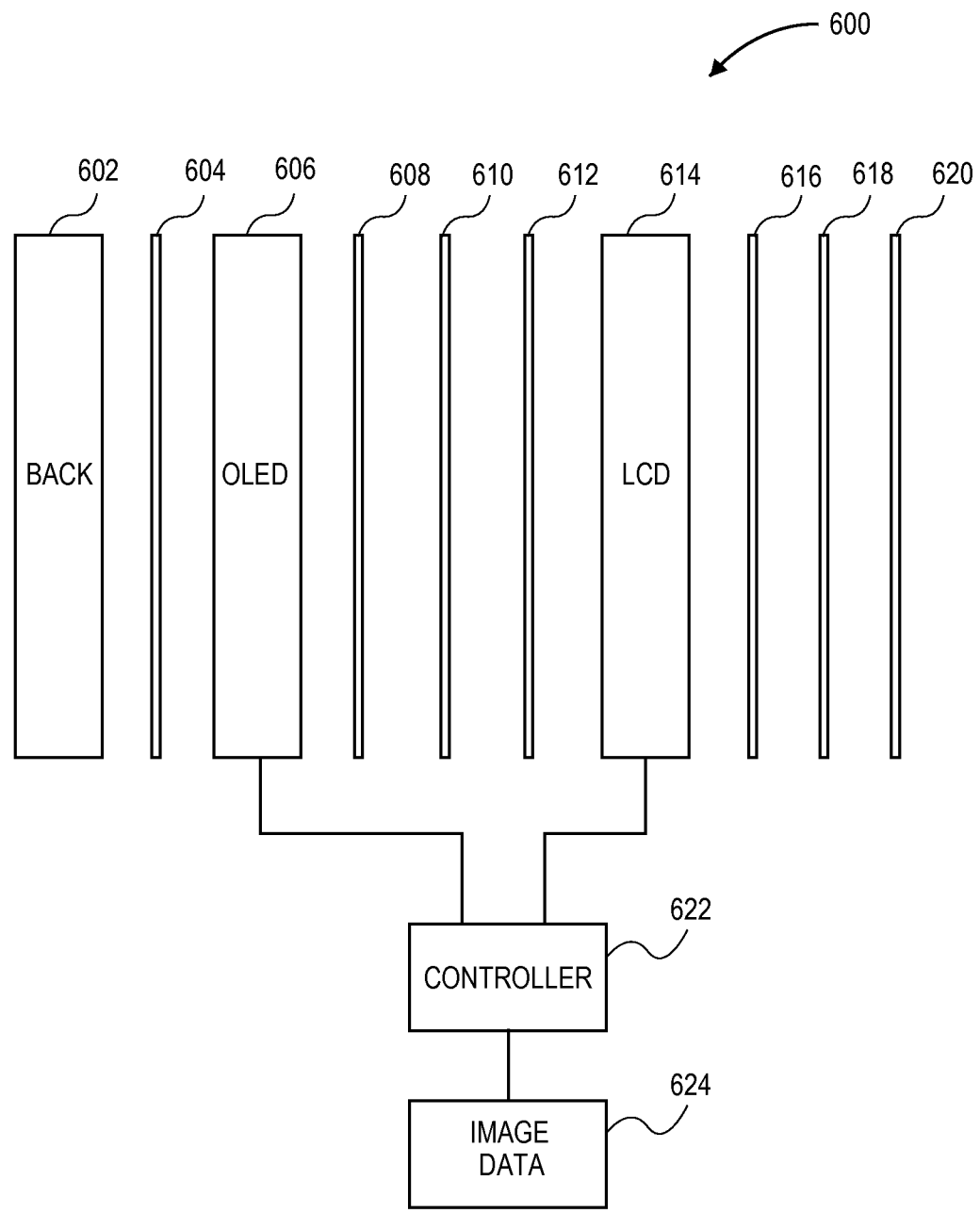
FIG. 6 shows another embodiment of display system having a wide color gamut performance and high energy efficiency.

FIG. 6 is a cross-sectional view of one embodiment of a display system (600) comprising a highly efficient backlight (e.g. OLED or high resolution LED array) 606 and a LCD panel 614. In one embodiment, display system 600 may further comprise a substrate back 602, reflective film 604 (such as ESR film), backlight 606 (e.g. OLED or high resolution LED array), UV light reflector 608 (which may be optionally included, if backlight is of the photoluminescent and/or fluorescent type), reflective polarizer 610, a high contrast polarizer 612, first LCD panel 614, finishing high contrast polarizer 616, color notch filter 618, and an optional front surface 620 for possible matte finish, scratch resistance, wider viewing angle, among other aspects.

In the embodiment comprising OLED backlight, the light emitted directly from such OLED backlight may be diffuse and not highly collimated. As light transmits through optical stack, light at shallow angles (as opposed light at normal incidence to the display) are more likely to be absorbed, as they have the longest distance to travels out of the display. Thus, it may be desired to place color notch filter 618 just before the final finishing film 620, as light here is better collimated and yet it is in front of any diffuser films 620. It will be appreciated; however, that the color notch filter may be placed in any other part of the optical stack for purposes of this application.

In some embodiments, it is possible to construct the backlight with a combination of light-emitting elements and light converting elements—e.g., quantum dot, fluorescent or other photoluminescent technology. For examples of quantum dot systems and illumination, the following commonly-owned applications: (1) Provisional U.S. Patent Application No. 61/486, 166 filed on May 13, 2011 entitled "TECHNIQUES FOR QUANTUM DOT ILLUMINATION"; (2) Provisional U.S. Patent Application No. 61/424,199 filed on Dec. 17, 2010, entitled "QUANTUM DOT MODULATION FOR DISPLAYS"; (3) Provisional U.S. Patent Application No. 61/448,599 filed on Mar. 2, 2011, entitled "N-MODULATION FOR WIDE COLOR GAMUT AND HIGH BRIGHTNESS"; (4) Provisional U.S. Patent Application No. 61486, 160 filed on May 13, 2011 entitled "TECHNIQUES FOR QUANTUM DOTS"; (5) Provisional U.S. Patent Application No. 61/486, 171 filed on May 13, 2011 entitled "QUANTUM DOTS FOR DISPLAY PANELS"—which are all hereby incorporated by reference in their entirety—describe systems and methods of employing quantum dots backlights and illumination.

Controller 622 takes image data 624 to be rendered on display system 600 and sends control and data signals to LCD panel 614—as well as to backlight 606, if the backlight is separately controllable. As emissive cells of highly efficient OLED or quantum dots are known in the art, it is possible to construct backlight 606 as an array of such independently controllable cells. As an alternative embodiment, backlight 606 may not be independently controllable. Instead, backlight 606 may be a uniform white background light produced by known light source—e.g. CCFL, LEDs, halogen, arc lamps or the like. In this embodiment, there need not be a separate control/data line connecting controller 622 and backlight 606.

In one embodiment, it is possible to make this display system is a thin configuration—whereby each of the optical elements are of a quarter of an inch thickness or less. Having a thin construction may be desirable as the amount of processing may be reduced if a smaller number of neighboring emissive cells transmit light through subpixels of the LCD panel. In such a case, the display system need not consider or concern itself with emitters having large point spread functions, as mentioned in the '695 application incorporated by reference above. In one embodiment, the display system may be constructed substantially without any air gaps, which makes sealing the entire display from dust possible. Laminating some or all of the layers together may prevent wetting, and tends to eliminate air-gap light losses. This may also give the display system additional structural rigidity.

While one embodiment may comprise multi-colored emitters, in another embodiment, the display system may be constructed more cost effectively if the emissive cells comprise white OLED or LED arrays, as are known in the art. Using white emitters, there is a reduction in the number of control lines and processing for tightly packed multi-colored packages of LEDs—whose light may combine to render a white light. In one embodiment, white OLED cells may have approximately 3× larger light emitting area per pixel than a design using multi-colored OLED cells. In addition, there may be a reduction of the number of control elements (approximately ⅓ the number when compared to multi-colored cell structure). With increased die sizes for each OLED element, it is possible to have greater brightness levels over a design using individual multi-colored OLED elements.

In this embodiment, white emitting elements (e.g. LED, OLED or the like) could be placed on a one-to-one aspect with each subpixel of the LCD modulator or, alternatively, one white emitting element could supply the illumination to a small number of subpixels. In this design, the display system may be capable of substantially infinite contrast, as different regions of the screen could present brightness levels of very bright (e.g. white emitting element modulated fully on, LCD modulated fully open) to absolutely black (e.g. white emitting element off, LCD modulated closed). This may have the added benefit of enhanced efficiency over existing displays, as only the lit areas of the screen would be drawing power.

In some embodiments, white emitting elements may be constructed with a combination of light-emitting and light-converting elements, in which first light spectra—e.g. blue, UV or the like—is converted to white light. In such embodiments, the optical stack (for example, as shown in FIG. 6) may have increased brightness by the use of a UV reflector, if the light-converting elements are reactive in UV light, to produce a white color.

As with the first embodiment noted above, if the display system of FIG. 6 employs a color notch filter, then this design would be capable of very wide color gamut (e.g. P3 or AdobeRGB color spaces), as each color filter would be acting completely independent of the adjacent color filters (e.g. in spectrum space) without any color overlap due to the finishing color notch filter. As also noted above, there is a degree of freedom in the placement of the color notch filter—e.g. the notch filter either in front of, or behind the LCD panel. In addition, there may be an opportunity to place the notch filter in different places within the optical stack to affect similar color performance.

Figure 7:
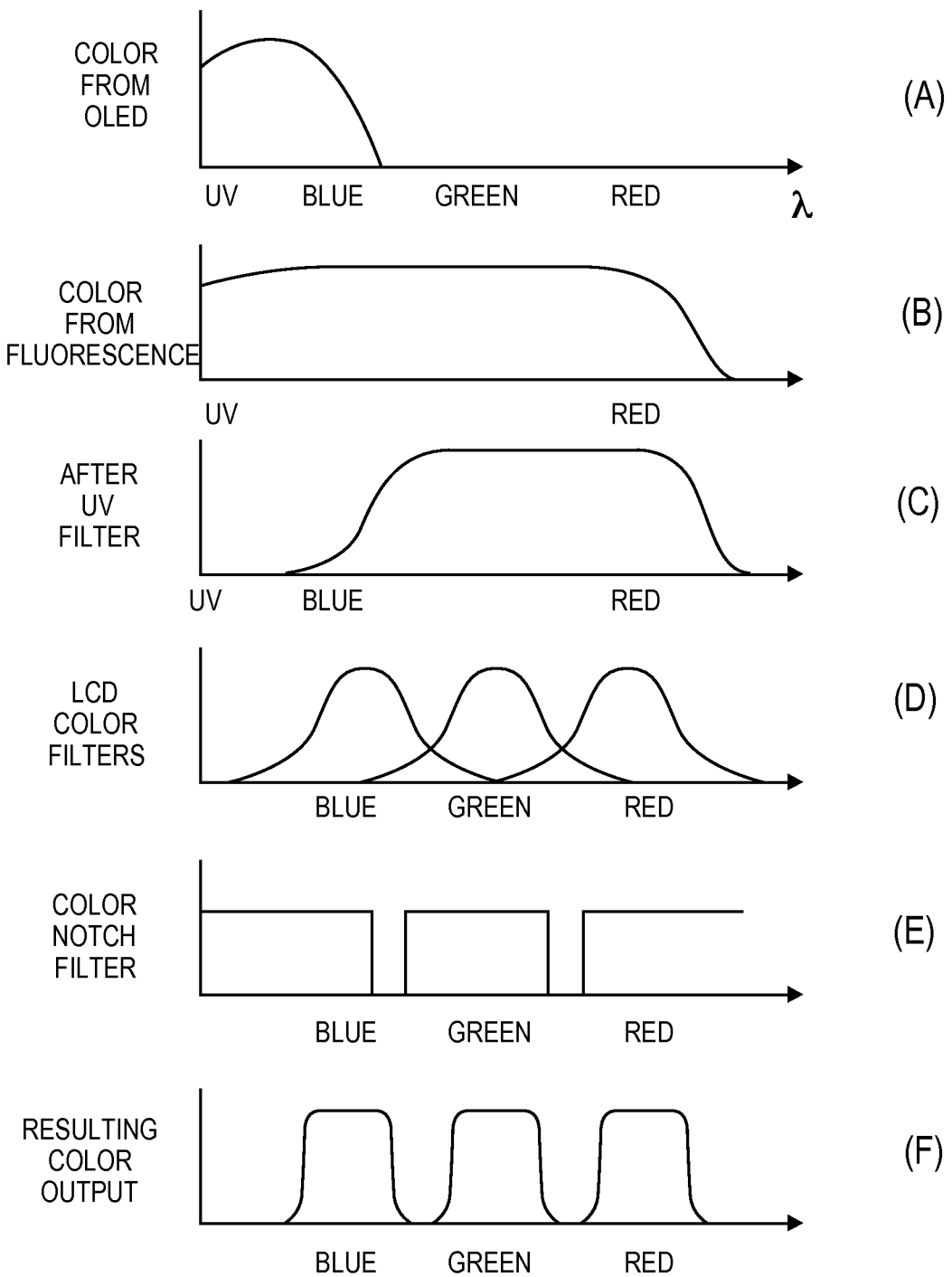
FIGS. 7A through 7F the various stages of the modulation of light through the optical stack of the display system as shown in FIG. 6.

FIGS. 7A through 7F shows the various stages of the modulation of light through the optical stack of the display system as shown in FIG. 6. Assuming that the display system in question employs white OLED elements, FIG. 7A shows the spectral output of a blue and/or UV emitter that emits blue and/or ultraviolet light to be absorbed in a photoluminescent layer that converts blue and/or UV light to a full spectrum white light. Efficiency of this OLED elements/layer may be increased by employing a full spectral reflector 604 and UV reflector 608 (i.e. a layer that passes full visible spectral light; but reflects UV light back down onto the photoluminescent layer of the OLED).

FIG. 7B shows the full spectral light that emanates from the OLED element/layer, prior to hitting the aforementioned UV reflector. FIG. 7C shows the full spectral visible light (i.e. minus the reflected UV light, plus the re-converter visible light) going to the LCD color filtered subpixels. FIG. 7D shows the light as transmitted through the color subpixels of the LCD display. As discussed above, there is some crosstalk between light of other regions of the spectrum that pass through a given colored subpixel (for example, some portions of blue and red light passing through a green colored subpixel, as part of the green filters band pass characteristics).

Color notch filter has the band pass characteristics as shown in FIG. 7E. After the notch filter conditions the light, the resulting color output is shown in FIG. 7F. As discussed above, the resulting color output gives a higher fidelity reproduction of highly saturated images, resulting in a display system that delivers substantially good color gamut performance.

Figure 8:
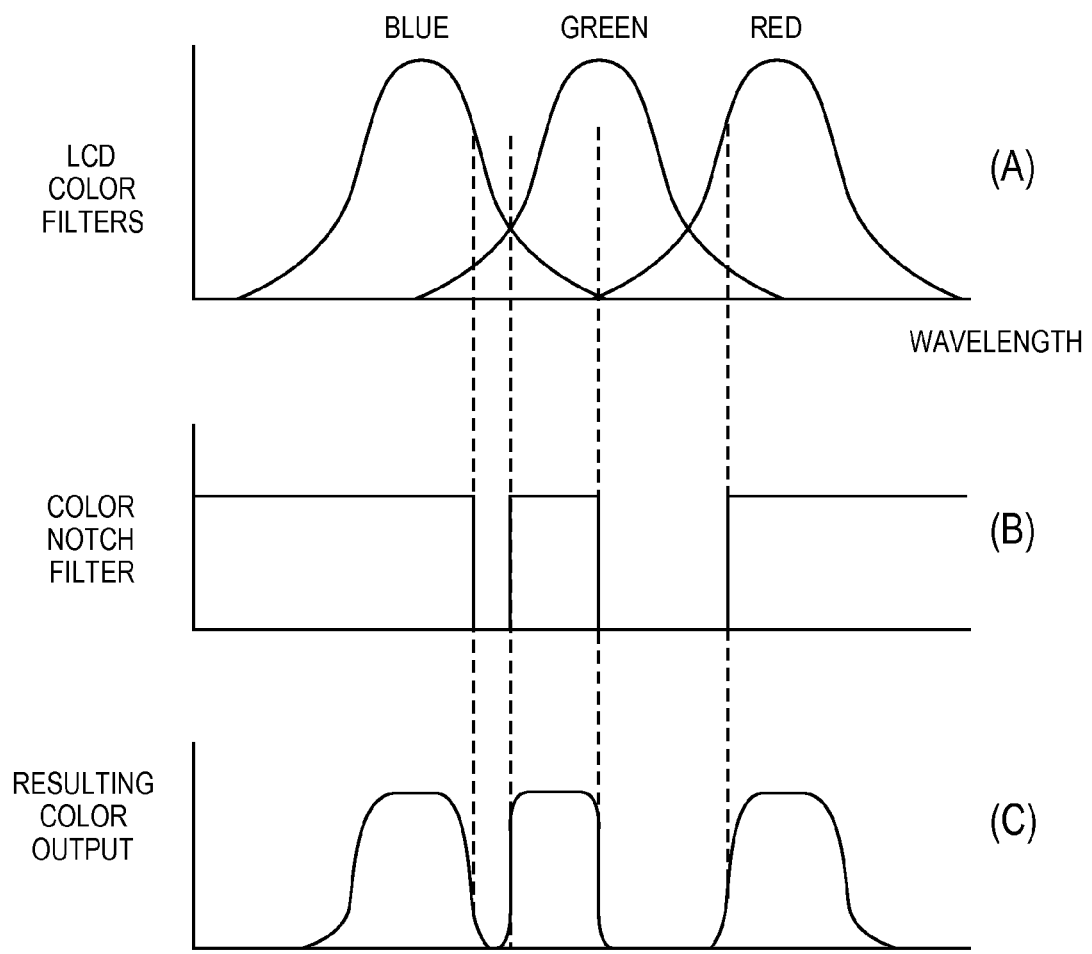
FIGS. 8A, 8B and 8C show another embodiment of the display system wherein the pass bands of the color notch filter are suitably adjusted in order to affect a display system with different gamut performance.

An alternative embodiment for a display system employing a slightly different color notch filter is shown in FIGS. 8A through 8C. In this embodiment, a different color notch filter may shift, narrow, broaden or likewise change the various pass bands to affect a display system with a desired color gamut performance. FIG. 8A is similar to that of FIG. 5A —color transmitted through LCD colored subpixels may have significant cross-talk between different colored subpixels, as discussed above. FIG. 8B depicts the band pass structure of the color notch filter in this embodiment. In comparison to FIG. 5B, the pass band for Green may be both shifted towards the blue part of the spectra—and, at the same time, narrowed to provide a color point that is more highly saturated in the blue-green (or cyan) part of the spectrum. The resulting color output is thus shown in FIG. 8C.

With the construction of different band pass structure for a color notch filter, it is possible to determine the overall color gamut performance of the display system. For example, it is possible to construct display systems with a desired overall gamut—e.g. P3, Adobe RGB or a brightened Rec 709. In order to perfect color balance and luminance in a rendered image, it will be appreciated that a suitable gamut mapping algorithm (GMA) and/or subpixel rendering (SPR) algorithm (as are known in the art) may be desired to be functioning within the controller (e.g. controller 120). The controller should have knowledge (for example, in the form of matrix coefficients in lookup tables or the like) of the selection of the color notch filter and its effect on the light in the optical stack with the other elements (such as one or more LCD modulators—either monochrome or colored subpixels). Taking input image data and running it through such an image processing pipeline (e.g. with GMA and/or SPR) would balance both chrominance and luminance data for the proper fidelity of the rendered image. One desirable aspect of such a system is the possibility of constructing display systems with lower cost LCDs (e.g. with conventional color filters) or other components—and, together with a suitable notch filter, have a display system with better color gamut performance (particularly on scenes, images, movies and the like having saturated colors therein).

Figure 9:
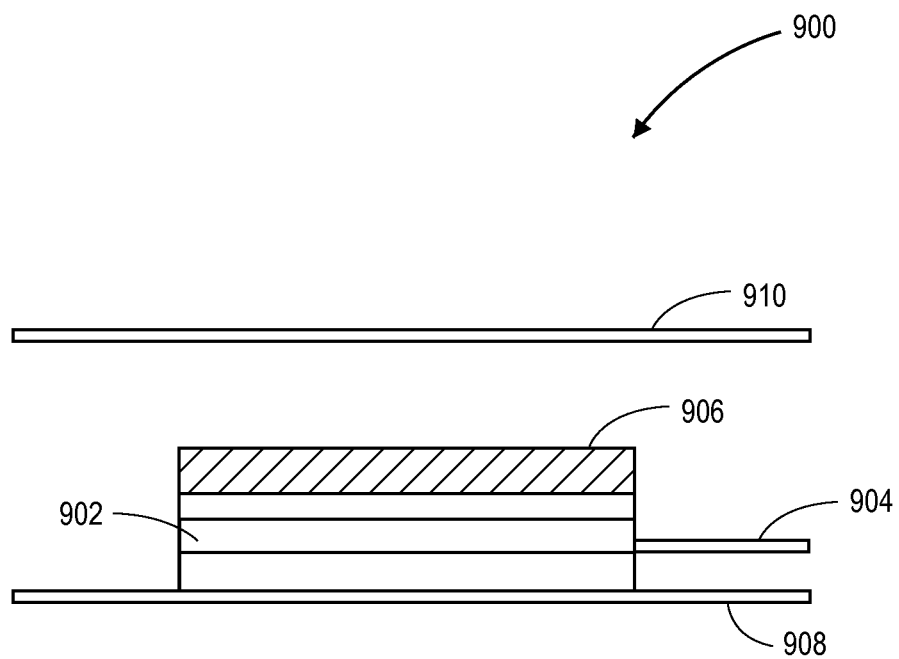
FIG. 9 shows one possible embodiment of a white OLED element that may be suitable in a display system, such as in FIG. 6.

FIG. 9 shows one possible embodiment of an OLED element 900 that may be suitable for the above display system embodiment. OLED element 900 comprises UV emitter 902, which may be activated by control line 904 (which, in turn, could be activated by the controller in FIG. 6). UV light emitted by emitter 902 excites fluorescent layer 906 (as is known in the art) to create a substantially white light emission. OLED element may be constructed above reflective layer 908 (e.g. ESR layer) to reflect full spectrum light. Light emanating from OLED element may be conditioned further by UV reflector 910 to increase the efficiency of OLED element.

As mentioned, the backlight of the display system could be constructed in a number of different ways. One embodiment is to construct the backlight as an array of discrete, individually controlled OLED elements (either in a one-to-one manner with the LCD subpixels, or in a lower resolution, one-to-many, configurations). In another embodiment, the OLED backlight could be constructed in a single, controllable layer, emitting a white light back illumination for the LCD panel. Also, as mentioned above, the display system may employ other backlights as is known in the art. For example, the backlight may be constructed as an array of light emitters, exciting quantum dots or other nano-material structures to affect a similar form of controllable backlight illumination.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A display system comprising:
    an emitter, the emitter comprising an array of light emitting elements of a same color controlled in a locally dimmed configuration and emanating light into an optical path;
    a diffuser, the diffuser diffusing the light emanating from the emitter;
    a color layer configured to receive light from the diffuser and mitigate crosstalk by emitting different passband-like color bands of distinct colors and provide a specific color gamut;

wherein the emitter as locally dimmed comprises a first modulator configured to transmit light through the diffuser and the color layer;

wherein the color layer placed in the optical path for convolving light together with the first modulator and a second modulator to produce a desired color gamut of the display;

a second modulator, comprising an LCD panel, the second modulator modulating light from the first modulator in a manner without color overlap such that each color filter of the LCD panel acts independent of adjacent color filters; and a controller, the controller receiving input image data and sending control signals to the first and the second modulators.

2. The display system as recited in claim 1 wherein the color layer comprises at least one of phosphorescent and quantum dot materials.

3. The display system as recited in claim 2, wherein the display system comprises substantially a color gamut of one of a group, the group comprising: P3 color gamut, Adobe RGB, and Rec 709.

4. The display according to claim 1, wherein a desired color gamut is a wide color gamut capable of saturated colors, and the color layer configured to produce saturated lights, and wherein the saturated lights are convolved together with the first modulator and the second modulator to produce the desired color gamut of the display.

5. A display system comprising:
an emitter, said emitter comprising a plurality of OLED elements, said OLED elements further comprising UV light-emitting element and UV light-converting elements;
a UV light reflector, said UV light reflector reflecting UV light back to said UV light-converting elements and transmitting visible light from said emitter;
a LCD modulator, said LCD modulator modulating light from said UV light reflector;
a color notch filter, said color notch filter filtering light from said LCD modulator; and
a controller, said controller receiving input image data and sending control signals to said LCD modulator.

6. The display system as recited in claim 5, wherein said color notch filter and said LCD modulator convolve the light emanating from said emitter to produce a desired color gamut of said display system.

7. The display system as recited in claim 6 wherein each said OLED element further comprising:
a UV emitter;
a control line, said control line connected to said UV emitter for providing an actuation signal to produce UV light;
a fluorescent material, said fluorescent material absorbing said UV light and converting said UV light into light in the visible spectrum.

8. The display system as recited in claim 7 wherein further said OLED element is constructed upon a full spectrum reflective surface, said full spectrum reflective surface reflects light back into the optical path of said display system.

9. The display according to claim 5, wherein the UV light-converting elements comprise quantum dots.

10. The display according to claim 5, wherein the UV light-converting elements comprise nano-structures.

11. The display according to claim 5, wherein the UV light-converting elements comprise a nano-material.

12. The display according to claim 5, wherein the display is constructed without air-gaps between layers.

13. The display according to claim 5, wherein the plurality of OLED elements are locally dimmed according to image data.

14. The display according to claim 5, wherein a desired color gamut comprises at least one of P3 color gamut, Adobe RGB, and Rec 709.

15. The display according to claim 5, wherein a desired color gamut comprises a wide color gamut.

16. The display according to claim 5, wherein the color notch filter comprises a color layer configured to mitigate crosstalk between adjacent pixels/subpixels of the LCD modulator by emitting different passband-like color bands of distinct colors.

17. The display according to claim 5, wherein a desired color gamut is a wide color gamut capable of saturated colors, and the color notch filter configured to produce saturated green light that is shifted towards blue part of the spectra and narrowed to provide a color point that is highly saturated in blue-green (or cyan).

* * * * *